US009239271B2

(12) United States Patent
Downie et al.

(10) Patent No.: US 9,239,271 B2
(45) Date of Patent: Jan. 19, 2016

(54) METHOD OF AND APPARATUS FOR MEASURING THE PRESSURE OF A GAS

(75) Inventors: Neil Alexander Downie, Odiham (GB); Marcel Behrens, Vilvoorde (BE)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 127 days.

(21) Appl. No.: 13/989,218

(22) PCT Filed: Nov. 28, 2011

(86) PCT No.: PCT/EP2011/071202
§ 371 (c)(1),
(2), (4) Date: Sep. 6, 2013

(87) PCT Pub. No.: WO2012/072590
PCT Pub. Date: Jun. 7, 2012

(65) Prior Publication Data
US 2013/0333774 A1 Dec. 19, 2013

(30) Foreign Application Priority Data
Nov. 29, 2010 (EP) .................................... 10192966

(51) Int. Cl.
*F16K 31/02* (2006.01)
*G01L 9/08* (2006.01)
*G01L 9/00* (2006.01)

(52) U.S. Cl.
CPC ......... *G01L 9/0022* (2013.01); *Y10T 137/7761* (2015.04)

(58) Field of Classification Search
CPC ..... G01L 9/0022; G01L 7/00; G01L 19/0007; G01L 19/04; G01L 19/06; Y10T 137/7761
USPC .......... 137/487.5; 73/700, 702, 704, 708, 714
See application file for complete search history.

(56) References Cited

U.S. PATENT DOCUMENTS 3,561,832 A 2/1971 Karrer et al.
3,612,966 A * 10/1971 Dybel ........................... 361/170

(Continued)

FOREIGN PATENT DOCUMENTS

DE 3345750 A1 6/1985
DE 3641842 A1 6/1988

(Continued)

OTHER PUBLICATIONS

European Patent Office, International Search Report for PCT Application No. PCT/EP2011/071202, mailed Jan. 23, 2012.

(Continued)

*Primary Examiner* — Craig Schneider
*Assistant Examiner* — Minh Le
(74) *Attorney, Agent, or Firm* — Larry S. Zelson

(57) ABSTRACT

There is provided a pressure gauge for measuring the pressure of a gas. The pressure gauge comprises a housing connectable to the gas source and comprising an interior which is, in use, in communication with said gas. The pressure gauge further comprising a sensor assembly located within said housing and including a piezoelectric oscillator which, in use, is located in contact with said gas, said sensor assembly being arranged to measure the oscillation frequency of said piezoelectric oscillator in said gas and configured to determine, from the frequency measurement and the known temperature and known molecular weight of the gas, the pressure of the gas. By providing such an arrangement, an overpressure proof yet accurate pressure gauge can be provided. This is in contrast to conventional gauges which are damaged permanently by overpressure situations.

17 Claims, 10 Drawing Sheets

(56) References Cited

U.S. PATENT DOCUMENTS

| | | | |
|---|---|---|---|
| 3,902,355 A * | 9/1975 | Weisser | 73/384 |
| 4,126,049 A * | 11/1978 | Cotter | 73/702 |
| 4,232,544 A | 11/1980 | Stansfeld | |
| 4,275,393 A * | 6/1981 | Johnston | 340/688 |
| 4,507,970 A * | 4/1985 | Dinger | 73/702 |
| 4,638,664 A * | 1/1987 | Tamura | G01L 9/0022 374/117 |
| 4,644,796 A * | 2/1987 | Ward | 73/702 |
| 4,644,804 A * | 2/1987 | Ramm et al. | 73/862.59 |
| 4,680,970 A * | 7/1987 | Ueda et al. | 73/702 |
| 4,724,707 A * | 2/1988 | Innerhofer | 73/384 |
| 4,734,609 A | 3/1988 | Jasmine | |
| 4,741,213 A * | 5/1988 | Hojoh | 73/702 |
| 4,747,311 A * | 5/1988 | Hojoh | 73/702 |
| 4,938,068 A * | 7/1990 | Clements | 73/704 |
| 4,995,263 A * | 2/1991 | Stocker | 73/702 |
| 5,136,885 A * | 8/1992 | Liebermann et al. | 73/702 |
| 5,220,836 A * | 6/1993 | Harms et al. | 73/702 |
| 5,231,880 A * | 8/1993 | Ward | G01L 9/0022 310/338 |
| 5,235,844 A * | 8/1993 | Bonne et al. | 73/24.01 |
| 5,275,055 A * | 1/1994 | Zook | G01P 15/097 310/309 |
| 5,307,668 A * | 5/1994 | Vander Heyden | 73/30.02 |
| 5,307,683 A * | 5/1994 | Phelps et al. | 73/708 |
| 5,471,882 A | 12/1995 | Wiggins | |
| 5,954,089 A * | 9/1999 | Seymour | 137/487.5 |
| 6,003,543 A * | 12/1999 | Sulatisky et al. | 137/487.5 |
| 6,092,423 A * | 7/2000 | Beardmore | G01C 19/5755 73/704 |
| 6,532,822 B1 * | 3/2003 | Boyd | G01L 9/0008 73/702 |
| 7,444,878 B1 * | 11/2008 | Pepples | G01L 9/007 73/722 |
| 2003/0053516 A1 * | 3/2003 | Atherton | G01K 7/32 374/143 |
| 2007/0186982 A1 * | 8/2007 | Cohen et al. | 137/487.5 |
| 2008/0184804 A1 * | 8/2008 | Leverrier et al. | 73/702 |
| 2009/0151461 A1 | 6/2009 | Ishii | |
| 2010/0107735 A1 * | 5/2010 | Pavlovsky | 73/24.04 |
| 2012/0256086 A1 * | 10/2012 | Husebo et al. | 250/307 |

FOREIGN PATENT DOCUMENTS

| | | |
|---|---|---|
| DE | 19901119 A1 | 7/2000 |
| DE | 10232823 A1 | 11/2003 |
| EP | 0101669 A2 | 2/1984 |
| EP | 0273649 A2 | 7/1988 |
| EP | 0484569 A1 | 5/1992 |
| EP | 0582045 A1 | 5/1993 |
| EP | 1930709 A1 | 11/2008 |
| JP | 1170824 A | 7/1989 |
| JP | 3068828 A | 3/1991 |
| JP | 2002122498 A2 | 4/2002 |
| TW | M334632 Y | 6/2008 |
| WO | 2011039534 A1 | 4/2011 |

OTHER PUBLICATIONS

Zeisel, D., H. Menzi and L. Ullrich, "A precise and robust quartz sensor based on tuning fork technology for (SF6)-gas density control", Sensors and Actuators 80, pp. 233-236 (2000).

Trafag AG data sheets "8773 Density Sensor" (4 pp.) from 1999 (brochure date 99/04).

"User handbook GMS gas monitor system", Riset AG, Schaffhausen (Switzerland), version of Jul. 6, 2001.

Boser, Niklaus MR., Affidavit of May 10, 2009, Riset, concerning the priority of the release of the user handbook of Nov. 6, 2001.

Tietze, U. and Schenk, Ch., "Semiconductor Circuit Technology", pp. 56-59 and pp. 354-357; fourth edition, Springer-Verlag Berlin Heidelberg New York, 1978.

Kuchling H., "Physik, Formein and Gesetze" [Physics, Formulae and Laws], pp. 164-169; 7th edition, Buch-und-Zeit-Verlagsgesellschaft mbH Cologne, 1969.

Decision of the German Federal Patents Court in the matter 20 W (pat) 357/04, handed down on Oct. 12, 2009 and retrievable shortly thereafter on the internet on the home page of the German Federal Patents Court.

Density Sensor 8774 data sheet from Trafag AG, date Jan. 2006.

* cited by examiner

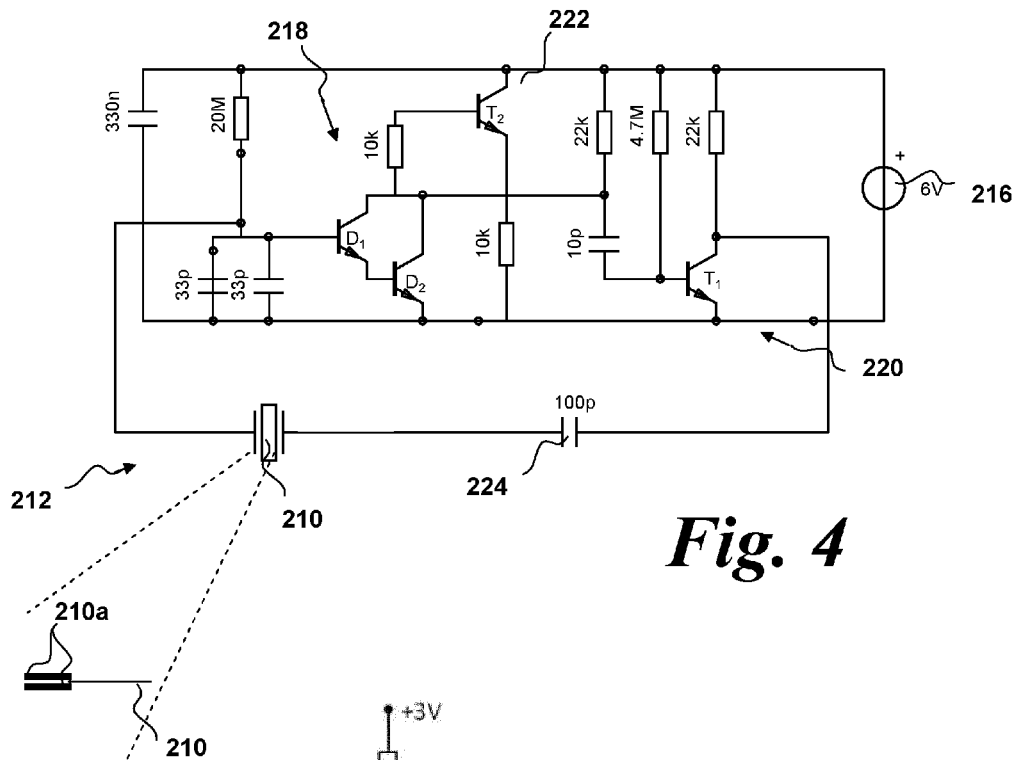
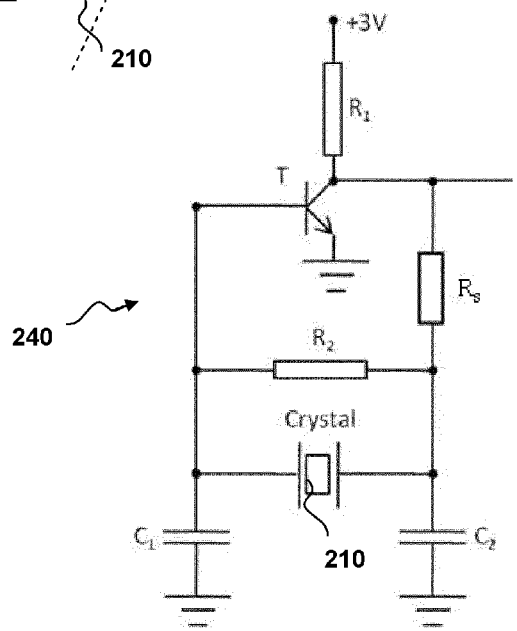
*Fig. 4*
*Fig. 5*

METHOD OF AND APPARATUS FOR MEASURING THE PRESSURE OF A GAS

The present invention relates a method of, and apparatus for, measuring the pressure of a gas. More particularly, the present invention relates to a method of, and apparatus for, measuring the pressure of a gas using a piezoelectric oscillator.

The methods and apparatus described herein are particularly applicable to systems where fluids under relatively high pressure (e.g. about 10 bar or higher) may be present, such as for example, the supply of gas from high pressure cylinders or manufacturing plants utilising high pressure gases. The present invention relates particularly to "clean" gases, i.e. gases with little or no impurities or contaminants such as water vapour or dust.

A compressed gas cylinder is a pressure vessel designed to contain gases at high pressures, i.e. at pressures significantly greater than atmospheric pressure. Compressed gas cylinders are used in a wide range of markets, from the low cost general industrial market, through the medical market, to higher cost applications, such as electronics manufacture utilising high purity corrosive, toxic or pyrophoric specialty gases. Commonly, pressurised gas containers comprise steel, aluminium or composites and are capable of storing compressed, liquefied or dissolved gases with a maximum filling pressure up to 450 bar g for most gases, and up to 900 bar g for gases such as hydrogen and helium.

The present invention is particularly applicable to permanent gases. Permanent gases are gases which cannot be liquefied by pressure alone, and for example can be supplied in gas cylinders at pressures up to 450 bar g. Examples are Argon and Nitrogen. However, this is not to be taken as limiting and the term gas may be considered to encompasses a wider range of gases, for example, both a permanent gas and a vapour of a liquefied gas.

Vapours of liquefied gases are present above the liquid in a compressed gas cylinder. Gases which liquefy under pressure as they are compressed for filling into a cylinder are not permanent gases and are more accurately described as liquefied gases under pressure or as vapours of liquefied gases. As an example, nitrous oxide is supplied in a cylinder in liquid form, with an equilibrium vapour pressure of 44.4 bar g at 15° C. Such vapours are not permanent or true gases as they are liquefiable by pressure or temperature around ambient conditions.

In order to dispense gases effectively and controllably from a gas cylinder or other pressure vessel, a regulator is required. The regulator is able to regulate the flow of the gas such that the gas is dispensed at a constant, or user variable, pressure.

Measurement of pressure in such systems is well known in the art and there are a variety of devices which function to measure pressure. The most conventional type uses an elastic diaphragm equipped with strain gauge elements. Another commonly used pressure gauge is a Bourdon gauge. Such a gauge comprises a flattened thin-wall, closed-ended tube which is connected at the hollow end to a fixed pipe containing the fluid pressure to be measured. An increase in pressure causes the closed end of the pipe to describe an arc.

Whilst these types of pressure gauges are relatively low in cost, they tend to be relatively large in size, and have a mechanical structure which is relatively complex and expensive to make. Additionally, such gauges comprise delicate components which make them vulnerable to damage from environmental factors such as exposure to high pressures.

For example, a conventional pressure gauge designed to operate reliably at pressure between 0-5 bar will be irreparably damaged if exposed to significantly greater pressures such as, for example, 200 bar. If this occurs, the gauge will require replacement. Further, the gauge may fail dangerously and may leak. This is a particular issue if flammable or combustible gases are present.

One situation in which such a gauge could become inadvertently exposed to excessively high pressures is known as "creep". Consider an arrangement whereby a pressure gauge is provided on the output of a high pressure regulator of a high pressure gas cylinder, and the output is shut off. In this case, the gas cylinder may be at, for example, 300 bar internal pressure. When left for a period of time, even a small leak of gas across the valve seat of the regulator may lead to pressures between the regulator and the closed outlet which are close to, and possibly even equal to, the internal pressure of the gas cylinder. Such pressures may damage a conventional pressure gauge beyond repair.

As another example, consider a 300 bar fixed pressure regulator having an inlet connected, via a high pressure isolation valve, to a high pressure gas cylinder. The outlet of the regulator is connected to a low pressure gauge. Such fixed pressure arrangements are configured to provide a constant outlet pressure of, for example, 5 bar. However, when the high pressure isolation valve is first opened, the pressure will pulse briefly to a much higher value before the diaphragm of the regulator is able to adjust to regulate the pressure. This brief pulse of high pressure may damage the pressure gauge.

An alternative type of device used to measure the physical properties of gases is a piezoelectric device such as a quartz crystal. Quartz crystals demonstrate piezoelectric behaviour, i.e. the application of voltage to them results in slight squeezing or stretching of the solid, and vice versa.

"*A Precise And Robust Quartz Sensor Based On Tuning Fork Technology For ($SF_6$) Gas Density Control*" Zeisel et al, Sensors and Actuators 80 (2000) 233-236 discloses an arrangement whereby a quartz crystal sensor is used to measure the density of $SF_6$ gas in high and medium voltage electrical equipment. The measurement of the density of the $SF_6$ gas is critical to the safety of the apparatus. Therefore, this disclosure is not concerned with pressure measurement.

U.S. Pat. No. 4,644,796 discloses a method and apparatus for measuring the pressure of a fluid using a quartz crystal oscillator housed within a variable-volume housing comprising a bellows arrangement. The internal volume of the housing varies due to compression/expansion of the bellows by external fluid pressure. Consequently, the density of the fluid within the housing varies as the internal volume of the housing varies. The density within the housing can be measured using a quartz crystal oscillator. However, the quartz crystal oscillator is not in contact with the fluid under measurement and, instead, indirectly measures the pressure of gas by changes in the internal volume of the housing.

According to a first aspect of the present invention, there is provided a method of measuring the pressure of a gas, the method comprising: a) measuring the oscillation frequency of a piezoelectric oscillator in contact with the gas; b) determining the pressure of the gas from the oscillation frequency of the piezoelectric oscillator, the known temperature of the gas and the known molecular weight of the gas.

By providing such a method, an over-pressure proof yet accurate pressure gauge can be provided. The piezoelectric oscillator is a solid state device which is resistant to high pressures, sudden changes in pressure or other environmental factors. This enables the piezoelectric oscillator to be entirely immersed in the gas and to be invulnerable to "creep" or other over-pressure situations. This is in contrast to conventional gauges (such as a Bourdon gauge) which requires a pressure differential in order to function and which are damaged permanently by overpressure situations.

In one embodiment, step b) comprises: driving, by means of a drive circuit, the piezoelectric oscillator such that the piezoelectric oscillator resonates at a resonant frequency; and measuring said resonant frequency over a pre-determined time period to determine the pressure of gas.

In one embodiment, the method further comprises: measuring the temperature of the gas using a temperature sensor.

In one embodiment, two piezoelectric oscillators are provided, one of the piezoelectric oscillators having a sensitivity coefficient greater than that of the other of the piezoelectric oscillators and the method further comprising, prior to step a), selecting one of the piezoelectric oscillators.

In one embodiment, said piezoelectric oscillator is provided downstream of a pressure reduction device.

In one embodiment, the or each piezoelectric oscillator comprises a quartz crystal oscillator.

In an embodiment, the quartz crystal comprises at least one tine. In a variation, the quartz crystal comprises a pair of planar tines.

In an embodiment, the quartz crystal is AT cut or SC cut.

In a variation, the surface of the quartz crystal is directly exposed to the gas.

In one embodiment, a sensor assembly is provided comprising a drive circuit. In a variation, the sensor assembly comprises a drive circuit comprising a Darlington pair arranged in a feedback configuration from a common emitter amplifier.

In one embodiment, the sensor assembly comprises a power source. In one arrangement, the power source comprises a lithium-ion battery.

In one embodiment, the sensor assembly comprises a processor.

According to a second aspect of the present invention, there is provided a pressure gauge for measuring the pressure of a gas, the pressure gauge comprising a housing connectable to the gas source and comprising an interior which is, in use, in communication with said gas, the pressure gauge further comprising a sensor assembly located within said housing and including a piezoelectric oscillator which, in use, is located in contact with said gas, said sensor assembly being arranged to measure the oscillation frequency of said piezoelectric oscillator in said gas and configured to determine, from the frequency measurement and the known temperature and known molecular weight of the gas, the pressure of the gas.

By providing such a pressure gauge, an over-pressure proof yet accurate pressure gauge can be provided. The piezoelectric oscillator is a solid state device which is resistant to high pressures, sudden changes in pressure or other environmental factors. This enables the piezoelectric oscillator to be entirely immersed in the gas and to be invulnerable to "creep" or other over-pressure situations. This is in contrast to conventional gauges (such as a Bourdon gauge) which requires a pressure differential in order to function and which are damaged permanently by overpressure situations.

In one arrangement, the sensor assembly further comprises a temperature sensor for measuring the temperature of the gas within said housing.

In one arrangement, the sensor assembly comprises a drive circuit for driving said piezoelectric oscillator at said resonant frequency.

In one embodiment, the sensor assembly comprises one or more of: a drive circuit, a processor and a power source.

In one embodiment, the drive circuit comprises a Darlington pair arranged in a feedback configuration from a common emitter amplifier.

In one embodiment, said piezoelectric oscillator comprises a quartz crystal oscillator.

In an embodiment, the quartz crystal comprises at least one tine. In a variation, the quartz crystal comprises a pair of planar tines.

In an embodiment, the quartz crystal is AT cut or SC cut.

In a variation, the surface of the quartz crystal is directly exposed to the gas.

In one embodiment, the sensor assembly comprises a drive circuit. In a variation, the sensor assembly comprises a drive circuit comprising a Darlington pair arranged in a feedback configuration from a common emitter amplifier.

In one embodiment, the sensor assembly comprises a power source. In one arrangement, the power source comprises a lithium-ion battery.

In one embodiment, the sensor assembly comprises a processor.

According to a third aspect of the present invention, there is provided a pressure reduction device comprising the pressure gauge of the second aspect.

In one embodiment, the pressure reduction device is in the form of a pressure regulator.

In one embodiment, the pressure reduction device is in the form of a valve or valve with integrated pressure regulator.

In one embodiment, the pressure regulator has a pressure range of between 0 to 5 bar.

In one embodiment, the pressure regulator is an electronic pressure regulator and the pressure gauge is operable to control the electronic pressure regulator.

In one embodiment, the electronic pressure regulator comprises a solenoid valve, the sensor assembly being operable to control, in use, the solenoid valve.

In one embodiment, the pressure regulator has a pressure range of between 0 to 5 bar.

According to a fourth aspect of the present invention, there is provided a computer program product executable by a programmable processing apparatus, comprising one or more software portions for performing the steps of the first aspect.

According to a fifth aspect of the present invention, there is provided a computer usable storage medium having a computer program product according to the fourth aspect stored thereon.

Embodiments of the present invention will now be described in detail with reference to the accompanying drawings, in which:

FIG. 4 is a schematic diagram of a drive circuit for use with an embodiment of the present invention;

FIG. 5 is a schematic diagram showing an alternative the drive circuit for use with an embodiment of the present invention;

Figure 1:
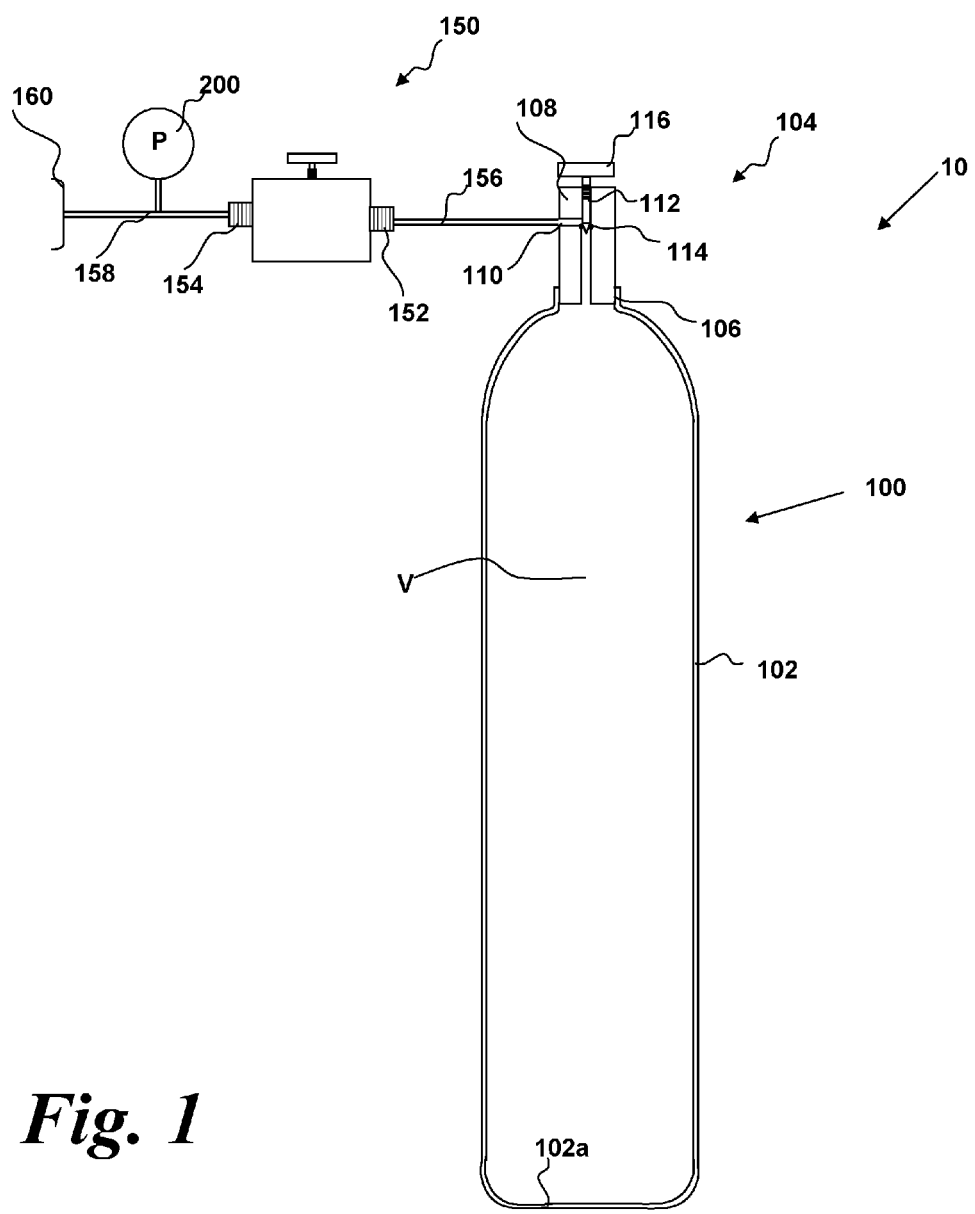
FIG. 1 is a schematic diagram of a gas cylinder and regulator assembly.

FIG. 1 shows a schematic view of a gas cylinder assembly 10, regulator and pressure gauge. The gas cylinder assembly 10 comprises a gas cylinder 100 having a gas cylinder body 102 and a valve 104. The gas cylinder body 102 comprises a generally cylindrical pressure vessel having a flat base 102a arranged to enable the gas cylinder assembly 10 to stand unsupported on a flat surface.

The gas cylinder body 102 is formed from steel, aluminium and/or composites material and is adapted and arranged to withstand internal pressures up to approximately 900 bar g. An aperture 106 is located at a proximal end of the gas cylinder body 102 opposite to the base 102a and comprises a screw thread (not shown) adapted to receive the valve 104.

The gas cylinder 100 defines a pressure vessel having an internal volume V. Any suitable fluid may be contained within the gas cylinder 100. However, the present embodiment relates, but is not exclusively limited to, purified permanent gases which are free from impurities such as dust and/or moisture. Non-exhaustive examples of such gases may be: Oxygen, Nitrogen, Argon, Helium, Hydrogen, Methane, Nitrogen Trifluoride, Carbon Monoxide, Krypton or Neon.

The valve 104 comprises a housing 108, an outlet 110, a valve body 112 and a valve seat 114. The housing 108 comprises a complementary screw thread for engagement with the aperture 106 of the gas cylinder body 102. The outlet 110 is adapted and arranged to enable the gas cylinder 100 to be connected to other components in a gas assembly; for example, hoses, pipes, or further pressure valves or regulators. The valve 104 may, optionally, comprise a VIPR (Valve with Integrated Pressure Regulator). In this situation, the regulator 150 (described later) may optionally be omitted.

The valve body 112 can be axially adjusted towards or away from the valve seat 114 by means of rotation of a graspable handle 116 selectively to open or to close the outlet 110. In other words, movement of the valve body 112 towards or away from the valve seat 112 selectively controls the area of the communication passageway between the interior of the gas cylinder body 102 and the outlet 110. This, in turn, controls the flow of gas from the interior of the gas cylinder assembly 100 to the external environment.

A regulator 150 is located downstream of the outlet 110. The regulator 150 has an inlet 152 and an outlet 154. The inlet 152 of the regulator 150 is connected to an inlet pipe 156 which provides a communication path between the outlet 110 of the gas cylinder 100 and the regulator 150. The inlet 152 of the regulator 150 is arranged to receive gas at a high pressure from the outlet 110 of the gas cylinder 100. This may be any suitable pressure; however, generally, the pressure of gas exiting the outlet 110 will be in excess of 20 bar and more likely to be in the region of 100-900 bar.

The outlet 154 is connected to an outlet pipe 158. A coupling 160 is located at the distal end of the outlet pipe 158 and is adapted for connection to further pipes or devices (not shown) for which the gas is required.

A pressure gauge arrangement 200 is located in communication with the outlet pipe 158 between the outlet 154 and the coupling 160. The pressure gauge arrangement 200 is located immediately downstream of the regulator 150 and is arranged to determine the pressure of the gas downstream of the regulator 150.

Figure 2:
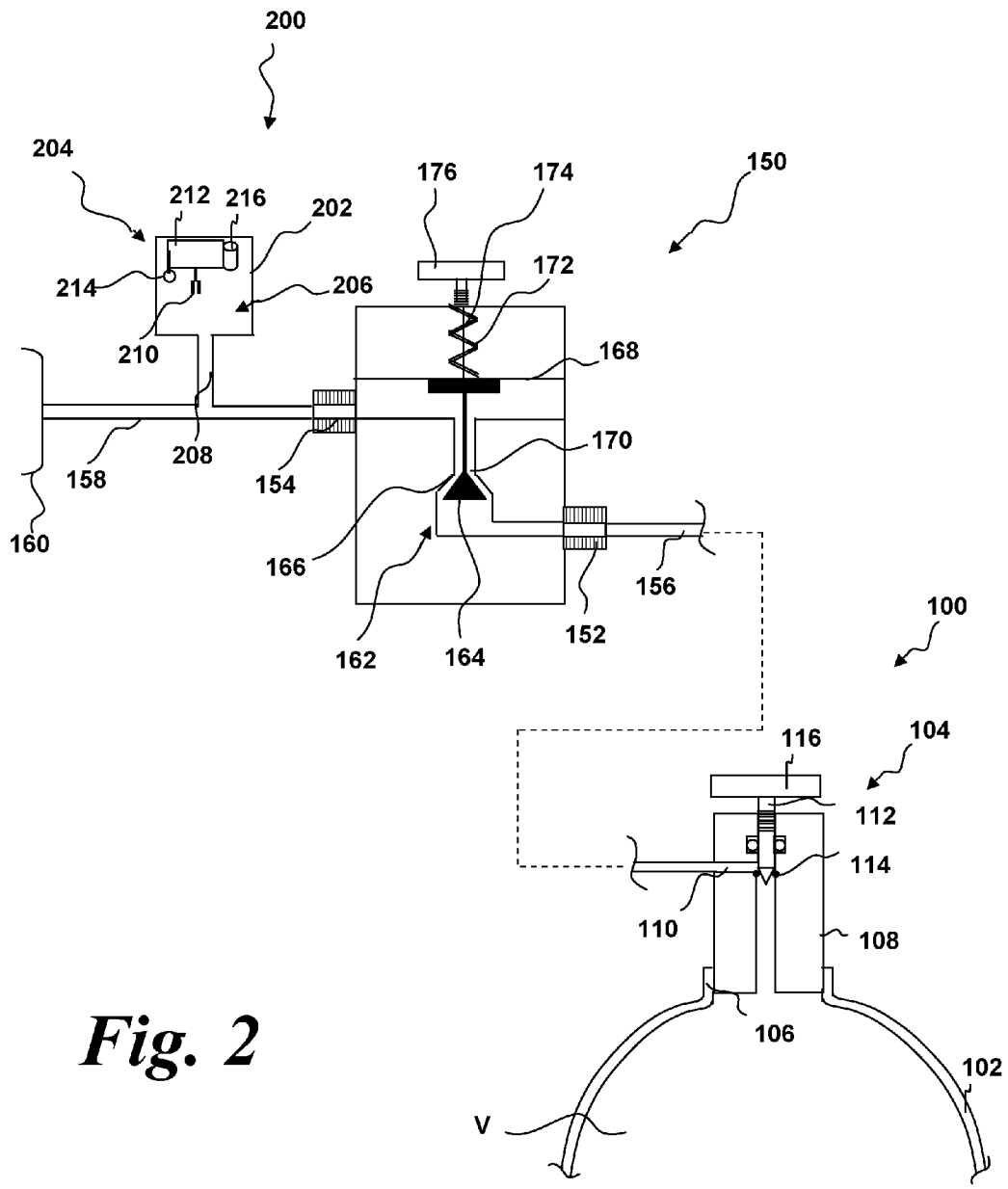
FIG. 2 is a schematic diagram showing an upper part of the gas cylinder, a regulator and a pressure gauge arrangement according to a first embodiment of the invention.

The regulator 150 and pressure gauge arrangement 200 are shown in greater detail in FIG. 2.

In this embodiment, the regulator 150 comprises a single diaphragm regulator. However, the skilled person would be readily aware of variations that could be used with the present invention; for example, a two diaphragm regulator or other arrangement.

The regulator 150 comprises a valve region 162 in communication with the inlet 152 and outlet 154. The valve region 162 comprises a poppet valve 164 located adjacent a valve seat 166. The poppet valve 164 is connected to a diaphragm 168 which is configured to enable translational movement of the poppet valve 164 towards and away from the valve seat 166 to close and open respectively an aperture 170 therebetween.

The diaphragm 168 is resiliently biased by a spring 172 located about a shaft 174. A graspable handle 176 is provided to enable a user to adjust the biasing force of the spring 172, thereby moving the position of the diaphragm 168 and, as a result, adjusting the equilibrium spacing between the poppet valve 164 and the valve seat 166. This enables adjustment of the dimensions of the aperture 170 through which the high pressure gas flow from the outlet 110 can pass.

The regulator 150 is operable to receive gas from the outlet 110 at full cylinder pressure (e.g. 100 bar), but to deliver gas at a substantially constant fixed low pressure (e.g. 5 bar) to the outlet 154. This is achieved by a feedback mechanism whereby the pressure of gas downstream of the aperture 170 is operable to act on the diaphragm 168 in opposition to the biasing force of the spring 172.

Therefore, should the pressure of gas in the region adjacent the diaphragm 168 exceed the specified level, the diaphragm 168 is operable to move upwards (relative to FIG. 2). As a result, the poppet valve 164 is moved closer to the valve seat 166, reducing the size of the aperture 170 and, consequently, restricting flow of gas from the inlet 152 to the outlet 154.

The pressure gauge arrangement 200 comprises a housing 202 and a sensor assembly 204. The housing 202 may comprise any suitable material; for example, steel, aluminium or composites. The housing has an interior 206 which is in communication with the interior of the outlet pipe 158 via a short feed pipe 208. Consequently, the interior 206 of the housing 202 is at the same pressure as the interior of the outlet pipe 158. In use, the housing 202 is generally sealed and isolated from the external atmosphere.

Alternatively, the housing 202 could be provided as part of the outlet pipe 158. For example, a part of the outlet pipe 158 could be widened to accommodate the sensor assembly 204. Alternatively, only part of the sensor assembly 204 may be located within the pipe 158, with the remainder being located outside or spaced therefrom.

Additionally, the housing 202 may form an integral part of the regulator 150. For example, the sensor assembly 204 may be located entirely within the outlet 154 of the regulator 150. The skilled person would be readily aware of variations and alternatives which fall within the scope of the present invention.

The sensor assembly 204 comprises a quartz crystal oscillator 210 connected to a drive circuit 212, a temperature sensor 214 and a battery 216. These components are located within the housing 202.

The drive circuit 212 and quartz crystal oscillator 210 will be described in detail later with reference to FIGS. 4 and 5. The temperature sensor 214 comprises a thermistor. Any suitable thermistor may be used. High accuracy is not required from the thermistor. For example, an accuracy of 0.5° C. is suitable for this embodiment. Consequently, cheap and small components can be used. However, in certain circumstances the temperature sensor 214 may be omitted. For example, in situations where the temperature is likely to be well known (e.g. at room temperature) or if the accuracy of temperature measurement is not critical to the application (e.g. the temperature can be assumed to lie within a particular range).

In this embodiment, the quartz crystal oscillator 210 is located in communication with the gas from the high pressure gas source. In other words, the quartz crystal oscillator 210 is in contact with, and exposed to, the gas from the gas source. A processor 230 (shown in FIG. 3) may also be provided, either separately or as part of the drive circuit 212. This will be described later.

In this arrangement, the quartz crystal oscillator 210 is constantly under isostatic pressure within the housing 202 of the pressure gauge arrangement 200 and, consequently, does not experience a pressure gradient. In other words, any mechanical stress originating from the pressure difference between external atmosphere and the internal components of the pressure gauge arrangement 200 is expressed across the housing 202.

In the embodiment of FIG. 2, the whole of the sensor assembly 204 is located within the housing 202. Therefore, the quartz crystal oscillator 210, the drive circuit 212 (and processor 230, if provided) and the battery 216 are all located within the interior 210 of the housing 202 of the pressure gauge arrangement 200. In other words, all of the components of the sensor assembly 204 are completely immersed in the gas and are under isostatic gas pressure within the housing 202.

However, this need not be so. For example, only the quartz crystal oscillator 210 and the temperature sensor 214 may be located within the housing 202, with the remainder of the sensor assembly 204 being located externally thereto.

The inventors have found that only a few components of the sensor assembly 204 are sensitive to high pressure. In particular, larger components such as batteries can be susceptible to high pressures. However, it has been found that lithium ion batteries perform particularly well under the high pressures encountered within the gas cylinder 100. Consequently, the battery 216 comprises lithium ion cells. However, alternative suitable power sources would be readily be contemplated by the skilled person.

The location of the sensor assembly 204 entirely within the housing 202 provides additional flexibility when configuring regulators 150. In particular, location of relatively fragile electronic components entirely within the strong metal or composite walls of the housing 202 provides considerable protection from environmental or accidental damage. This is particularly important, for example, in storage areas or depots, where gas cylinders 100 comprising regulators 150 are located adjacent other gas cylinders 100, heavy machinery or rough surfaces.

Additionally, the internal location of the sensor assembly 204 protects these components from environmental conditions such as salt, water and other contaminants. This would allow, for example, a high impedance circuit which is highly sensitive to salt and water damage to be used as part of the sensor assembly 204.

The benefits of internal location of the sensor assembly 204 are unique to solid state sensor devices such as the quartz crystal oscillator 210. For example, a conventional pressure sensor such as a Bourdon gauge cannot be located in this manner. Whilst a crystal-based sensor can operate totally immersed in gas at constant pressure, a conventional pressure sensor is unable to measure isostatic pressure and requires a pressure gradient in order to function. Consequently, a conventional pressure gauge must be located between the high pressure to be measured and the atmosphere. This increases the risk of damage to external components of the pressure gauge.

Figure 3:
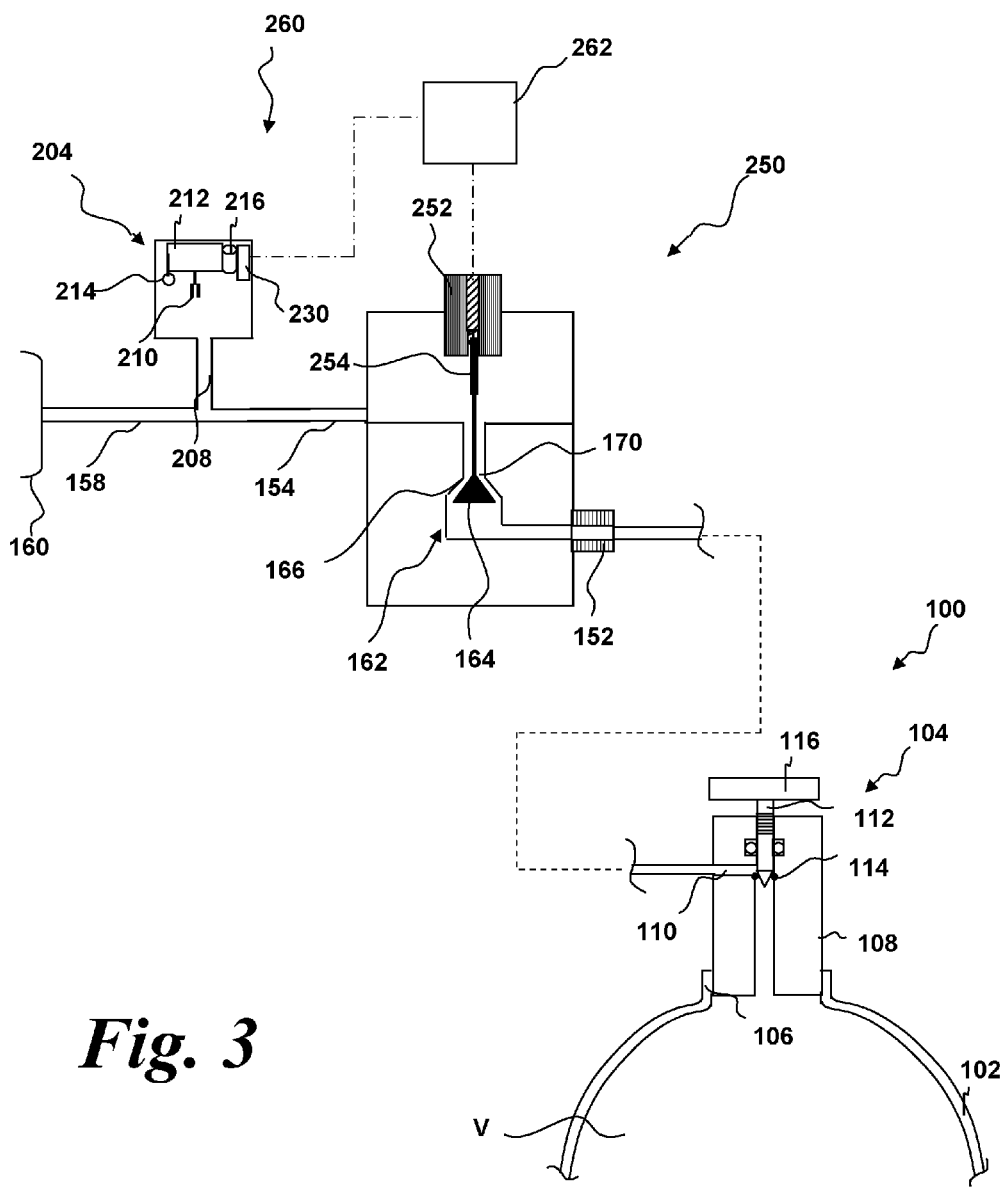
FIG. 3 is a schematic diagram showing an upper part of the gas cylinder, a regulator and a pressure gauge arrangement according to a second embodiment of the invention.

A second embodiment of the invention is shown in FIG. 3. The features of the second embodiment shown in FIG. 3 which are in common with the first embodiment of FIG. 2 are allocated the same reference numerals and will not be described again here.

In the embodiment of FIG. 3, the regulator 250 differs from the regulator 150 of the FIG. 2 embodiment in that the regulator 250 is arranged to provide automatic control of gas from the outlet 154 by means of a solenoid valve 252. The solenoid valve 252 comprises an armature 254 which is movable in response to an electric current through the coils (not shown) of the solenoid valve 252. The armature 254 is movable to open or to close the poppet valve 164 and, consequently, the aperture 170.

The solenoid valve 252 shown in FIG. 3 is in the normally open condition. In other words, in the absence of an electrical current through the solenoid valve 252, the armature 254 is in an extended position such that the poppet valve 164 is open, i.e. the aperture 170 is open. If a current is applied to the solenoid valve 252, the armature 254 will retract and the poppet valve 164 will close.

The skilled person would be readily aware of alternative variations of solenoid valve which could be used with the present invention. For example, instead of acting directly on the poppet valve 164, the armature 254 could act directly on a diaphragm such as the diaphragm 168 shown in FIG. 2. Alternatively, the armature 254 could control flow through a narrow conduit in communication with the outlet 154 in order to regulate movement of the diaphragm 168. Such an arrangement is known as a diaphragm pilot valve. Alternatively, the poppet valve could be eliminated and a diaphragm could be the valve member controlling directly the flow of gas from the inlet 152 to the outlet 154.

The second embodiment comprises a pressure gauge arrangement 260. Components of the pressure gauge arrangement 260 in common with the pressure gauge arrangement 200 are allocated the same reference numerals for clarity.

The pressure gauge arrangement 260 is substantially similar to the pressure gauge arrangement 200 of the first embodiment. However, the pressure gauge arrangement 260 further comprises an electronic solenoid drive 262 connected to the solenoid valve 252 and to the sensor assembly 204. The solenoid drive 262 is arranged to receive a signal from the sensor assembly 204 and to control the solenoid valve 252 in response to that signal. Consequently, the pressure gauge arrangement 260 is operable to control the flow of gas through the regulator 250. In other words, the pressure gauge arrangement 260 and solenoid valve 252 form a feedback loop which allows precise and remote pressure regulation downstream of the outlet 154. This may be particularly applicable to situations where remote management of pressure flow is required, for example, in automatic applications such as welding machines.

The solenoid drive 262 may comprise any suitable drive circuit for controlling the solenoid valve 252. One suitable circuit may be an operational amplifier arrangement having an input from the sensor assembly 204 to the negative terminal of the operational amplifier. Consequently, a variable resistor could be attached to the positive terminal. The variable resistor may be arranged to provide a constant reference level and act as a comparator. The reference level may be varied automatically or manually.

An input from the sensor assembly 204 to the solenoid drive 262 will cause operation of the solenoid valve 252. For example, if the input signal from the sensor assembly 204 (or, alternatively, the processor 230) exceeds a particular threshold level, the solenoid drive 262 may energise the solenoid valve 252. The solenoid valve 252 may be controlled in a digital (i.e. on or off) manner where a DC voltage is varied between a maximum and a minimum value. Alternatively, the DC voltage from the solenoid drive 262 may be continuously variable to adjust the position of the poppet valve 164 accurately.

Additionally or alternatively, the solenoid drive 262 may control the solenoid valve 252 by means of a DC output comprising an AC component. Since the extension of the armature 254 from the solenoid valve 252 is approximately proportional to the applied current, this causes the armature 254 of the solenoid valve 252 to oscillate. Such oscillations mitigate stiction of the armature 254, i.e. assist in preventing the armature 254 from becoming stuck or jammed.

Alternatively, other control arrangements, such as FETs, processors or ASICs may be used as appropriate to control the operation of the solenoid valve 252. Further, the solenoid valve 252 may operate in either a digital (i.e. on/off) or analogue (i.e. continuously variable) modes to enable accurate movement of the poppet valve 164 or similar.

In FIG. 3 the main components of the pressure gauge arrangement 260 are shown separately from the regulator 250. In such a situation, the regulator 250 may be controlled remotely by means of wireless communication between the sensor assembly 204 and the solenoid drive 252. However, this need not be so. For example, the pressure gauge arrangement 260 could be entirely integrated into the regulator 250 and form an integral part thereof. Therefore, the pressure gauge arrangement 260 and regulator 250 may form a unitary, self-regulating component which could be positioned at the outlet to a gas source and which could remotely and automatically control the pressure of gas flowing therefrom.

The sensor assembly 204 will now be described in more detail with reference to FIGS. 4 and 5. The quartz crystal oscillator 210 comprises a small, thin section of cut quartz. Quartz demonstrates piezoelectric behaviour, i.e. the application of a voltage across the crystal causes the crystal to change shape, generating a mechanical force. Conversely, a mechanical force applied to the crystal produces an electrical charge.

Two parallel surfaces of the quartz crystal oscillator 210 are metallised in order to provide electrical connections across the bulk crystal. When a voltage is applied across the crystal by means of the metal contacts, the crystal changes shape. By application of an alternating voltage to the crystal, the crystal can be caused to oscillate.

The physical size and thickness of the quartz crystal determines the characteristic or resonant frequency of the quartz crystal. Indeed, the characteristic or resonant frequency of the crystal 210 is inversely proportional to the physical thickness between the two metallised surfaces. Quartz crystal oscillators are well known in the art and so the structure of the quartz crystal oscillator 210 will not be described further here.

Additionally, the resonant vibration frequency of a quartz crystal will vary depending upon the environment in which the crystal is located. In a vacuum, the crystal will have a particular frequency. However, this frequency will change in different environments. For example, in a fluid, the vibration of the crystal will be damped by the surrounding molecules and this will affect the resonant frequency and the energy required to oscillate the crystal at a given amplitude.

Additionally, deposition of surrounding materials onto the crystal will affect the mass of the vibrating crystal, altering the resonant frequency. This forms the basis for commonly used selective gas analysers in which an absorbing layer is formed on the crystal and increases in mass as gas is absorbed.

However, in the present case, no coating is applied to the quartz crystal oscillator 210. Indeed, adsorption or deposition of material onto the quartz crystal oscillator 210 is undesirable in the present case since the accuracy of the measurement may be affected.

The quartz crystal oscillator 210 of the present embodiment is tuning fork-shaped and comprises a pair of tines 210a (FIG. 4) approximately 5 mm long arranged to oscillate at a resonant frequency of 32.768 kHz. The tines 210a are formed in the planar section of quartz. The tines 210a of the fork oscillate normally in their fundamental mode, in which they move synchronously towards and away from each other at the resonant frequency.

Fused (or non-crystalline) quartz has a very low temperature-dependent coefficient of expansion and a low coefficient of elasticity. This reduces the dependence of the fundamental frequency on temperature and, as will be shown, temperature effects are minimal.

Additionally, it is desirable to use quartz which is AT cut or SC cut. In other words, the planar section of quartz is cut at particular angles, so that the temperature coefficient of the oscillation frequency can be arranged to be parabolic with a wide peak around room temperature. Therefore, the crystal oscillator can be arranged such that the slope at top of the peak is precisely zero.

Such crystals are commonly available at relative low cost. In contrast to the majority of quartz crystal oscillators which are used in vacuo, in the present embodiment the quartz crystal oscillator 210 is exposed to the gas under pressure in the housing 202.

The drive circuit 212 for driving the quartz crystal oscillator 210 is shown in FIG. 4. The drive circuit 212 must meet a number of specific criteria. Firstly, the quartz crystal oscillator 210 of the present invention may be exposed to a range of gas pressures; potentially, the pressures may vary from atmospheric pressure (when the gas cylinder 100 is empty) to around 900 bar g if the gas cylinder contains a pressurised gas such as hydrogen. Thus, the quartz crystal oscillator 210 is required to operate (and restart after a period of non-use) under a wide range of pressures.

Consequently, the quality (Q) factor of the quartz crystal oscillator 210 will vary considerably during use. The Q factor is a dimensionless parameter relating to the rate of damping of an oscillator or resonator. Equivalently, it may characterise the bandwidth of a resonator relative to its centre frequency.

In general, the higher the Q factor of an oscillator, the lower the rate of energy loss relative to the stored energy of the oscillator. In other words, the oscillations of a high Q factor oscillator reduce in amplitude more slowly in the absence of an external force. Sinusoidally driven resonators having higher Q factors resonate with greater amplitudes at the resonant frequency but have a smaller bandwidth of frequencies around that frequency for which they resonate.

The drive circuit 212 must be able to drive the quartz crystal oscillator 210 despite the changing Q factor. As the pressure in the gas cylinder 100 increases, the oscillation of the quartz crystal oscillator 210 will become increasingly damped, and the Q factor will fall. The falling Q factor requires a higher gain to be provided by an amplifier in the drive circuit 212. However, if too high an amplification is provided, the drive circuit 212, the response from the quartz crystal oscillator 210 may become difficult to distinguish. In this case, the drive circuit 212 may simply oscillate at an unrelated frequency, or at the frequency of a non-fundamental mode of the quartz crystal oscillator 210.

As a further limitation, the drive circuit 212 must be low power in order to run on small low power batteries for a long time with or without supplementary power such as photovoltaic cells.

The drive circuit 212 will now be described with reference to FIG. 4. In order to drive the quartz crystal oscillator 210, the drive circuit 212 essentially takes a voltage signal from the quartz crystal oscillator 210, amplifies it, and feeds that signal it back to the quartz crystal oscillator 210. The fundamental resonant frequency of the quartz crystal oscillator 210 is, in essence, a function of the rate of expansion and contraction of the quartz. This is determined in general by the cut and size of the crystal.

However, external factors also affect the resonant frequency. When the energy of the generated output frequencies matches the losses in the circuit, an oscillation can be sustained. The drive circuit 212 is arranged to detect and maintain this oscillation frequency. The frequency can then be measured by the processor 230, used to calculate the appropriate property of the gas required by the user and, if required, output to a suitable display means (as will be described later).

The drive circuit 212 is powered by a 6 V battery 216. The battery 216, in this embodiment, comprises a lithium ion battery. However, alternative power sources will be readily apparent to the person skilled in the art; for example, other battery types both rechargeable and non-rechargeable and a solar cell arrangement.

The drive circuit 212 further comprises a Darlington pair Common Emitter amplifier 218. The Darlington pair comprises a compound structure consisting of two bipolar NPN transistors $D_1$ and $D_2$ configured such that the current amplified by a first of the transistor is amplified further by the second one. This configuration enables a higher current gain to be obtained when compared to each transistor being taken separately. Alternative, PNP bipolar transistors may be used.

The Darlington pair 218 is arranged in a feedback configuration from a single transistor ($T_1$) Common Emitter amplifier 220. A NPN bipolar junction transistor is shown in FIG. 5. However, the skilled person would be aware of alternative transistor arrangements which may be used; for example, a bipolar junction PNP transistor or Metal Oxide Semiconductor Field Effect Transistors (MOSFETs).

As a variation, automatic gain control (not shown) could be implemented in the feedback loop between the Darlington pair 218 and the Common Emitter amplifier 220. This may take the form of a potentiometer, variable resistor or other suitable component located in place of, for example, the rightmost 22 k resistor shown in FIG. 4.

Automatic gain control enables compensation for changes in Q-factor with pressure and changes in supply voltage (for example, under low battery conditions). Automatic gain control may be particularly applicable for low pressure applications.

The drive circuit 212 comprises a further NPN emitter follower transistor $T_2$ which acts as a buffer amplifier 222. The buffer amplifier 222 is arranged to function as a buffer between the circuit and the external environment. However, this feature is optional and may not required; for example, a FET could be directly connected to drive the circuit 212.

A capacitor 224 is located in series with the quartz crystal oscillator 210. The capacitor 224, in this example, has a value of 100 pF and enables the drive circuit 212 to drive the quartz crystal oscillator 210 in situations where the crystal has become contaminated, for example by salts or other deposited materials.

Additionally, the drive circuit 212 may be optimised for fast start of the quartz crystal oscillator 210. In order to achieve this, a further resistor and further capacitor may be connected between the base of transistor $D_1$ and ground. These components may comprise, for example, a 10 MΩ resistor and a 10 nF capacitor.

An alternative drive circuit 240 will now be described with reference to FIG. 5. The drive circuit shown in FIG. 5 is configured similarly to a Pierce oscillator. Pierce oscillators are known from digital IC clock oscillators. In essence, the drive circuit 240 comprises a single digital inverter (in the form of a transistor) T, three resistors $R_1$, $R_2$ and $R_S$, two capacitors $C_1$, $C_2$, and the quartz crystal oscillator 210.

In this arrangement, the quartz crystal oscillator 210 functions as a highly selective filter element. Resistor $R_1$ acts as a load resistor for the transistor T. Resistor $R_2$ acts as a feedback resistor, biasing the inverter T in its linear region of operation. This effectively enables the inverter T to operate as a high gain inverting amplifier. Another resistor $R_S$ is used between the output of the inverter T and the quartz crystal oscillator 210 to limit the gain and to dampen undesired oscillations in the circuit.

The quartz crystal oscillator 210, in combination with $C_1$ and $C_2$ forms a Pi network band-pass filter. This enables a 180 degree phase shift and a voltage gain from the output to input at approximately the resonant frequency of the quartz crystal oscillator. The above described drive circuit 240 is reliable and cheap to manufacture since it comprises relatively few components.

The gain of the drive circuit 240 is generally lower than for the drive circuit 212. A lower gain may make restarting the quartz crystal oscillator 210 more difficult when the quartz crystal oscillator 210 is exposed to high pressures. However, in the present application, the circuit 240 is particularly attractive due to the generally low pressure environment in which the pressure gauge arrangements 200, 260 are likely to be used.

As discussed above, the sensor assembly 204 may include a processor 230 which receives inputs from the quartz crystal oscillator 210 and drive circuit 212. The processor 230 may comprise any suitable arrangement. The processor 230 may comprise a microprocessor or central processing unit (CPU), or may comprise an Application Specific Integrated Circuit (ASIC) or Field Programmable Gate Array (FPGA). Alternatively, the processor 230 may simply be a collection of logic gates or other simple processor configured to perform the necessary calculation required in the above-described embodiments.

When used with the quartz crystal oscillator 210, the processor 230 may be configured to measure the frequency f or period of the signal from the drive circuit 212. This may be achieved by, for example, counting oscillations over a fixed time, and convert that frequency into a density value using an algorithm or look-up table. This value is passed to the processor 230.

The processor 230 may, optionally, be designed for mass production to be identical in all pressure gauge arrangements 200, with different features in the software and hardware enabled for different gases.

Additionally, the processor 230 may also be configured to minimise power consumption through implementation of standby or "sleep" modes which may cover the processor 230 and additional components such as the drive circuit 212 and quartz crystal oscillator 210.

Various schemes may be implemented; for example, the processor 230 may be on standby for 10 seconds out of every 11 seconds. Further, the processor 230 may control the quartz crystal oscillator 210 and drive circuit 212 such that these components are put on standby for he majority of time, only being switching the more power hungry components on for ½ second every 30 seconds.

Additionally, the pressure gauge arrangement 200 may be connected to an antenna (not shown) for remote communication with, for example, a base station. This will be discussed later. In this case, the antenna may be located internally or externally of the housing 202 and connected to the sensor assembly 204 by means of a wire or equivalent connector. The antenna itself may be adapted and arranged to use any suitable communication protocol; for example, a non-exhaustive list may be RFID, Bluetooth, Infra red (IR), 802.11 wireless, frequency modulation (FM) transmission or a cell network.

Alternatively, one-wire communication may be implemented. One-wire communication needs only a single metallic conductor to communicate: the 'return' path of the circuit is provided by capacitive coupling through the air between the communicating devices. The skilled person would be readily aware of alternatives of the antenna (and associated transmission hardware) which could be used with the embodiments discussed herein.

However, remote communication is possible without an external aerial or antenna being explicitly required. For example, communication may be effected by means of acoustic transmission from within the housing 202. Acoustic transmission may be effected by a transmitter located within the housing 202. The transmitter may comprise, for example, a simple fixed-frequency piezoelectric resonator.

A complementary receiver is also required and this component may be located remote from the pressure gauge arrangement 200 and may comprise hardware such as, for example, a phase-locked loop tone detector integrated with a microphone. Such an acoustic arrangement provides the advantage that no feed-through is required (as is the case for an external antenna) and that all of the electronic components can be located entirely within the housing 202 of the pressure gauge arrangement 200.

Figure 6:
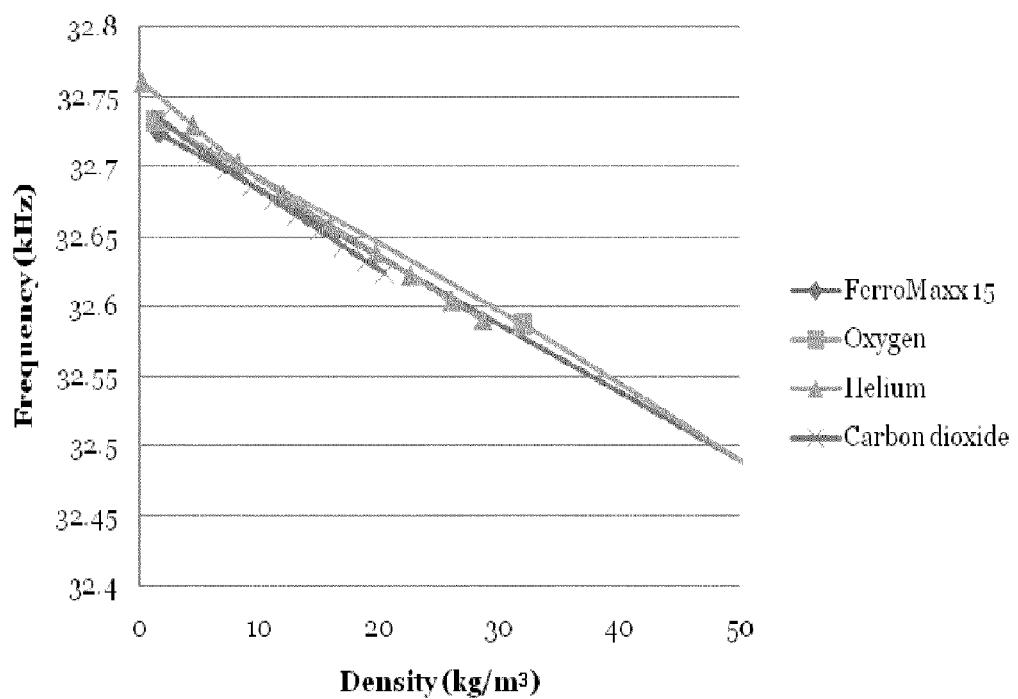
FIG. 6 shows a graph of quartz crystal frequency (kHz) on the Y-axis as a function of density (kg/m$^3$) for a number of different gases.

The theory and operation of the pressure gauge arrangement 200 will now be described with reference to FIGS. 6 to 8.

The quartz crystal oscillator 210 has a resonant frequency which is dependent upon the density of the fluid in which it is located. Exposing an oscillating tuning fork-type crystal oscillator to a gas leads to a shift and damping of the resonant frequency of the crystal (when compared to the resonant frequency of the crystal in a vacuum). There are a number of reasons for this. Whilst there is a damping effect of the gas on the oscillations of the crystal, the gas adheres to the vibrating tines 210a of the tuning fork crystal oscillator 210 which increases the mass of the oscillator. This leads to a reduction in the resonant frequency of the quartz crystal oscillator according to the motion of a one-sided, fixed elastic beam:

$$\frac{\Delta\omega}{\omega_0} = \frac{\rho t}{2\rho_q w}\left(c_1 + c_2 \frac{\partial}{t}\right) \quad 1)$$

Where $$\frac{\Delta\omega}{\omega_0}$$

is the relative change in resonant angular frequency, $\rho$ is the gas density, t is the thickness of the quartz oscillator, $\rho_q$ is the density of the quartz oscillator and w is the width of the fork. $c_1$ and $c_2$ are geometrically dependent constants and $\partial$ is the thickness of the surface layer of gas as defined by:

$$\partial = \sqrt{\frac{2\eta}{\rho\omega_0}} \quad 2)$$

Where $\eta$ is the temperature dependent viscosity of the gas.

The two parts of equation 1) relate to a) the additive mass of the gas on the tines of the quartz crystal oscillator 210 and to b) the shear forces arising on the outermost surface layer of the tines during oscillation.

The equation can thus be rewritten in terms of frequency and simplified to:

$$\Delta f = A\rho + B\sqrt{\rho} + C \quad 3)$$

Where $$A = \frac{c_1 t}{2\rho_q w} f_0, \quad B = \frac{c_2}{2\rho_q w} \sqrt{\frac{\eta}{\pi}} \sqrt{f_0}$$

and C is an offset constant. $f_0$ is the natural resonant frequency of the crystal in a vacuum.

It has been found by the inventors that a suitably good approximation can be obtained by approximating:

$$\Delta f \approx A\rho \quad 4)$$

Consequently, to a good approximation, the change in frequency is proportional to the change in density of the gas to which the quartz crystal oscillator is exposed. FIG. 6 shows, for a number of different gases/gas mixtures, that the resonant frequency of the quartz crystal oscillator 210 varies linearly as a function of density.

In general, the sensitivity of the quartz crystal oscillator 210 is that a 5% change in frequency is seen with, for example, Oxygen gas (having Atomic mass number 32) at 250 bar when compared to atmospheric pressure. Such pressures and gas densities is typical of the storage cylinders used for permanent gases, which are normally between 137 and 450 bar g for most gases, and up to 700 or 900 bar g for helium and hydrogen.

Additionally, the quartz crystal oscillator 210 is particularly suitable for use as a sensor for commercially-supplied gases. Firstly, in order to sense correctly the density of a gas, it is necessary for the gas to be free from dust and droplets of liquids, which is guaranteed with commercially supplied gases, but not with air or in the generality of pressure monitoring situations.

The above illustrates that the frequency response of the quartz crystal oscillator 210 is, to a good approximation, proportional to density. However, in order to measure pressure, it is required to derive a relationship between pressure and density. This is determined from:

$$PV = nRT \quad\quad 5)$$

Where P is the pressure of gas, V is the volume of gas, n is the number of moles of gas, R is the gas constant and T is the temperature. Following on:

$$\rho = \frac{M}{V} \quad\quad 6)$$

And $$MW = \frac{M}{n} \quad\quad 7)$$

where MW is the molecular weight of gas and M is the mass of gas. Therefore, substituting for V in equation 5) leads to:

$$P = \frac{\rho RT}{MW} \quad\quad 8)$$

Consequently, for a known molecular weight of gas (or average molecular weight of gas in the case of a known mixture), the pressure of gas can be accurately derived from the density of the gas and the temperature of the gas.

The above approximations assume that the compressibility of the gas, Z, is equal to one. In conventional arrangements, this approximation only holds for low pressures in cases where a direct measurement of pressure is made. At high pressures, the compressibility Z is not proportional to the gas pressure in the way expected of an ideal gas. Therefore, a conventional pressure gauge such as a Bourdon gauge must be corrected for compressibility in order to correctly read the contents—mass of gas—of a gas cylinder at high pressures. It was shown previously that the quartz crystal oscillator 210 is intrinsically corrected for compressibility Z when measuring density. But when measuring pressure at high pressure values, a quartz gauge must be corrected for Z.

Figure 7:
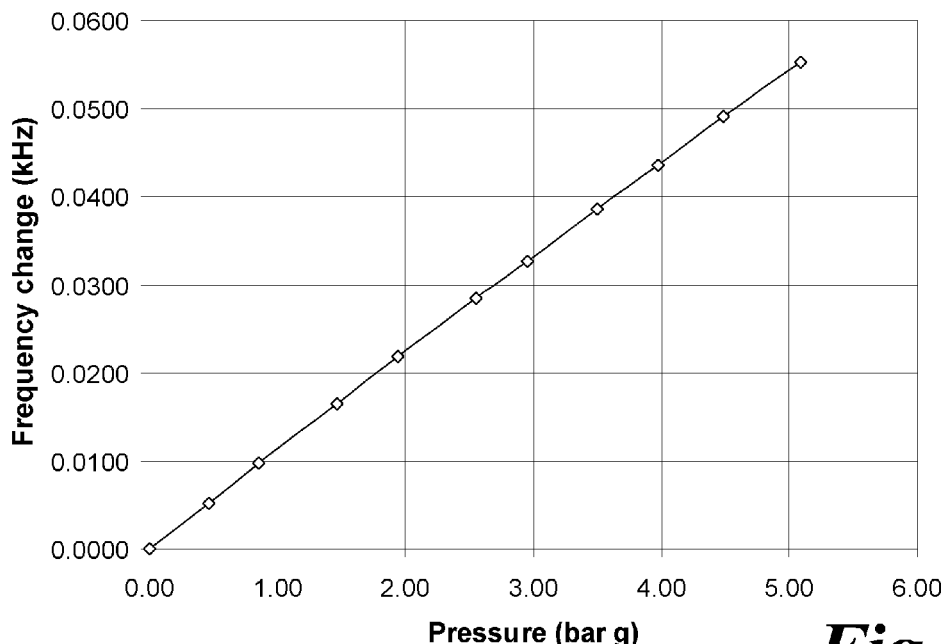
FIG. 7 shows a graph of frequency change (in kHz) on the Y-axis as a function of pressure (bar g) on the X-axis for a quartz crystal oscillator immersed in Ferromax 15 (comprising 82.5% Ar, 15% $CO_2$ and 2.5% $O_2$) for low pressures.
Figure 8:
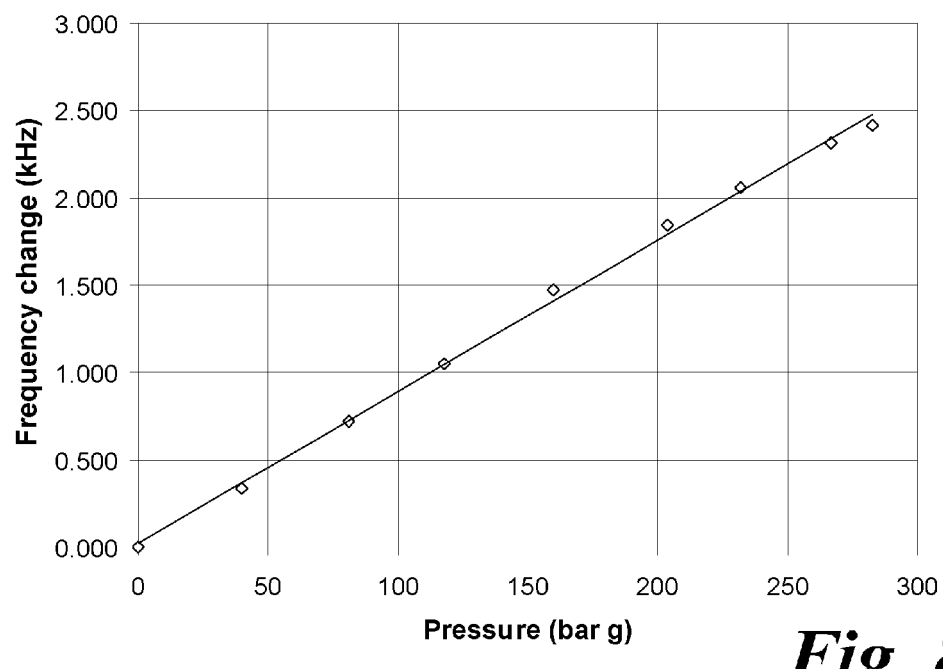
FIG. 8 shows a graph of frequency change (in kHz) on the Y-axis as a function of pressure (bar g) on the X-axis for a quartz crystal oscillator immersed in Ferromax 15 (comprising 82.5% Ar, 15% $CO_2$ and 2.5% $O_2$) for high pressures.

FIGS. 7 and 8 illustrate the frequency response of the quartz crystal oscillator 210 as a function of pressure. FIG. 7 shows a graph of frequency change (in kHz) on the Y-axis for the quartz crystal oscillator 210 as a function of pressure (bar g) on the X-axis for pressures in the range 0-6 bar g. FIG. 8 shows a graph of frequency change (in kHz) on the Y-axis for the quartz crystal oscillator 210 as a function of pressure (bar g) on the X-axis for pressures in the range 0-300 bar g. In both cases, the gas used was Ferromax 15, which comprises 82.5% Ar, 15% $CO_2$ and 2.5% $O_2$.

As illustrated in FIGS. 7 and 8, to a good approximation, the change in frequency $\Delta f$ of the quartz crystal oscillator 210 is linear with pressure over two orders of magnitude of pressure. Therefore, if the temperature and molecular weight of the gas is known, then the quartz crystal oscillator 210 is operable to function as an accurate pressure gauge.

As described previously, the temperature can easily be measured using cheap and widely available components such as a thermistor. Further, in the case of permanent gases supplied to consumers packaged in gas cylinders, the molecular weight of the gas (or average molecular weight of a homogeneous mixture of gases) is generally very well known.

Therefore, whilst the above described approach may be inaccurate if the gas is not uniform for example, if the gas is a non-uniform mixture like a partially liquid-filled cylinder or a recently prepared and insufficiently mixed mixture of light and heavy gases, such a situation is unlikely to occur in most packaged gas applications.

Additionally, it is surprising that the quartz crystal oscillator 210 is operable over a range of pressures between 0 to 300 bar g, whilst being sufficiently accurate to measure reliably pressure values two orders of magnitude lower than the upper limit of this range. This property makes the quartz crystal oscillator 210 particularly suitable for use as a pressure gauge as part of the pressure gauge arrangement 200.

This is because the pressure gauge arrangement 200 is able to reliably and accurately measure small pressure variations as may typically be measured in a low pressure application (e.g. between 0 and approximately 5 bar g) such as that immediately downstream of the regulator 150.

The arrangement as described above is particularly suitable for measurement of low pressures where there is risk of high pressures occurring during use. Since the quartz crystal oscillator 210 is a solid state component and is operable at pressures up to 900 bar, should an initial overpressure condition occur in the outlet pipe 158, the sensor assembly 204 will be unaffected and will continue to operate as required. In other words, the inventors have developed an accurate low pressure gauge which is entirely resistant to exposure to high pressures.

In contrast, a conventional pressure gauge such as a Bourdon gauge will be damaged permanently and may fail if exposed to even a brief pulse of high pressure gas such as may occur during "creep" conditions or when a gas cylinder is first operated.

Additionally, the arrangement of the present invention enables pressures to be measured to very high accuracy with a resolution of parts per million. Coupled with the linear response of the quartz crystal oscillator 210 to density and/or pressure, the high accuracy enables even very light gases such as $H_2$ and He to be measured accurately.

Further, if compressibility is taken into account, then the same gauge is capable of reading even higher pressures without any modification. In contrast, a conventional pressure gauge would only be suitable for a particular pressure range and would have to be replaced in order to read a different pressure range.

Figure 9:
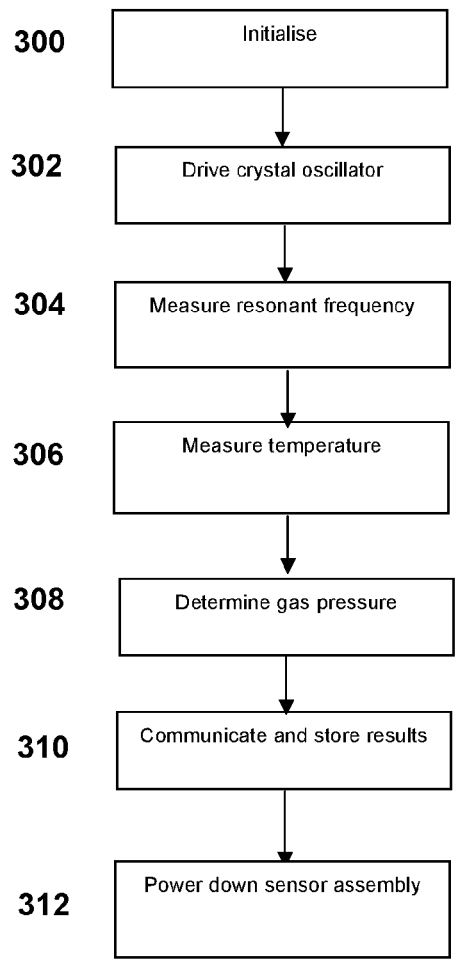
FIG. 9 is a flow chart illustrating a method according to a described embodiment.

A method according to an embodiment of the present invention will now be described with reference to FIG. 9. The method described below is applicable both of the first and second embodiments described above.

Step 300: Initialise Measurement

At step 300, the measurement of the pressure of gas downstream of the outlet 158 is initialised. This may be activated by, for example, a user pressing a button on the outside of the gas cylinder 100. Alternatively, the measurement may be initiated by means of a remote connection, for example, a signal transmitted across a wireless network and received by the pressure gauge arrangement 200 through an antenna.

As a further alternative or addition, the pressure gauge arrangement 200 may be configured to initialise remotely or on a timer. The method proceeds to step 302.

Step 302: Drive the Quartz Crystal Oscillator

Once initialised, the drive circuit 212 is used to drive the quartz crystal oscillator 210. During initialisation, the drive circuit 212 applies a random noise AC voltage across the crystal 210. At least a portion of that random voltage will be at a suitable frequency to cause the crystal 210 to oscillate. The crystal 210 will then begin to oscillate in synchrony with that signal.

By means of the piezoelectric effect, the motion of the quartz crystal oscillator 210 will then generate a voltage in the resonant frequency band of the quartz crystal oscillator 210. The drive circuit 212 then amplifies the signal generated by the quartz crystal oscillator 210, such that the signals generated in the frequency band of the quartz crystal resonator 202 dominate the output of the drive circuit 212. The narrow resonance band of the quartz crystal filters out all the unwanted frequencies and the drive circuit 212 then drives the quartz crystal oscillator 210 at the fundamental resonant frequency f. Once the quartz crystal oscillator 210 has stabilised at a particular resonant frequency, the method proceeds to step 304.

Step 304: Measure Resonant Frequency of Quartz Crystal Oscillator

The resonant frequency f is dependent upon the pressure conditions within the housing 202. In turn, the pressure conditions in the interior 206 of the housing 202 are representative of the pressure conditions downstream of the outlet 154 of the regulator 150.

In the present embodiment, the change in resonant frequency $\Delta f$ is, to a good approximation, proportional in magnitude to the change in pressure of the gas in the interior 206 of the housing 202 and will decrease with increasing pressure.

In order to make a measurement, the frequency of the quartz crystal oscillator 210 is measured for a period of approximately 1 s. This is to enable the reading to stabilise and for sufficient oscillations to be counted in order to determine an accurate measurement. The measurement of frequency is carried out in the processor 230. The processor 230 may also log the time, $T_1$, when the measurement was started.

Once the frequency has been measured, the method proceeds to step 306.

Step 306: Measure Temperature of Gas

At step 306, the temperature sensor 214 measures the temperature of the gas within the housing 202. This measurement is carried out for the purpose of calculating the pressure from the frequency change measured in step 304.

The temperature measurement does not need to be particularly accurate. For example, if the temperature sensor 214 is accurate to 0.5° C., then this corresponds to an error of only approximately one part in six hundred (assuming normal atmospheric temperatures) on the absolute temperature value required for the calculation of pressure in step 308.

However, in certain circumstances the temperature sensor 214 may be omitted. For example, in situations where the temperature is likely to be well known (e.g. at room temperature) or if the accuracy of temperature measurement is not critical to the application (e.g. the temperature can be assumed to lie within a particular range). In this case, the determination of temperature in step 306 can be considered to be the allocation of a particular temperature value stored by the processor 230 and used in the calculation of pressure in subsequent steps.

Step 308: Determine the Outlet Pressure of Gas

Once the frequency of the quartz crystal oscillator 210 has been measured satisfactorily in step 304 and the temperature measured in step 306, the processor 230 then calculates the pressure of gas within the interior 206 of the housing 202.

This is done using equation 8) above where the pressure P of the gas can be calculated directly from the density, the temperature and the molecular weight of the gas in question. Therefore, knowing the resonant frequency as measured in step 304, the known temperature T of the gas in the housing 202 measured in step 306 and the known molecular weight of the gas (or average molecular weight of a mixture of gases), an accurate measurement of pressure can be made. The method then proceeds to step 310.

Step 310: Communicate and Store Results

The pressure of gas displayed in a number of ways. For example, a screen (not shown) attached to the housing 202 or regulator 150 could display the pressure of gas downstream of the outlet 154 of the regulator 150. In the alternative, the pressure measurement could be communicated remotely to a base station or to a meter located on an adjacent fitting as will be described later.

Once the pressure of the gas has been determined, this may also be recorded in an internal memory associated with the processor 230 of the pressure gauge arrangement 200 for later retrieval. As a yet further alternative, pressure of gas at time $T_1$ could be stored in a memory local to said processor 230 to generate a time log.

The method then proceeds to step 312.

Step 312: Power Down Sensor Assembly

It is not necessary to keep the pressure gauge arrangement 200 operational at all times. To the contrary, it is beneficial to reduce power consumption by switching the pressure gauge arrangement 200 off when not in use. This prolongs the life of the battery 216.

The configuration of the drive circuit 212 enables the quartz crystal oscillator 210 to be restarted irrespective of the gas pressure in the housing 202. Therefore, the pressure gauge arrangement 200 can be shut down as and when required in order to save battery power.

Variations of the above embodiments will be apparent to the skilled person. The precise configuration of hardware and software components may differ and still fall within the scope of the present invention. The skilled person would be readily aware of alternative configurations which could be used.

Figure 10:
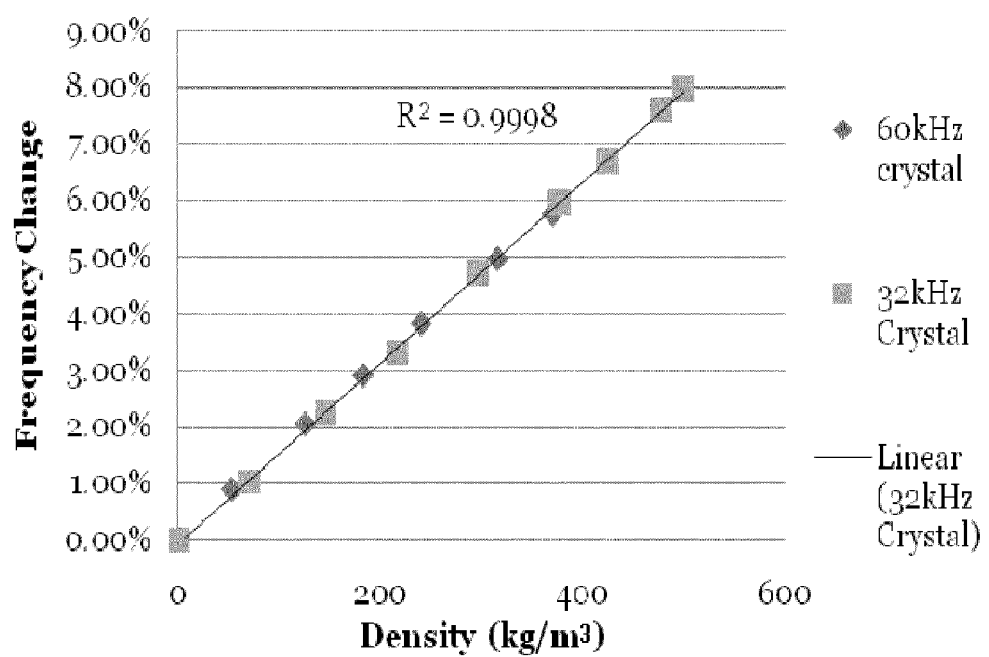
FIG. 10 shows a graph of the frequency behaviour of different crystal types.

For example, the above described embodiments have utilised a quartz crystal oscillator having a fundamental frequency of 32.768 kHz. However, crystals operating at alternative frequencies may be used. For example, quartz crystal oscillators operating at 60 kHz and 100 kHz may be used with the embodiments described above. A graph showing the frequency change with density for different crystals is shown in FIG. 10. As a further example, a crystal oscillator operating at a frequency of 1.8 MHz could be used.

Higher frequency operation enables the pressure to be monitored more frequently because a shorter time period is required to sample a given number of cycles. Additionally, higher frequency crystals enable a smaller duty cycle to be used in a "sleep" mode of a crystal. By way of explanation, in most cases, the crystal and drive circuit will spend most of the time switched off, only being switched on for a second or so when a measurement is needed. This may occur, for example, once a minute. When a higher frequency crystal is used, the pressure can be measured faster. Therefore, the time in which the crystal is operational can be reduced. This may reduce power consumption and concomitantly improve battery life.

Figure 11:
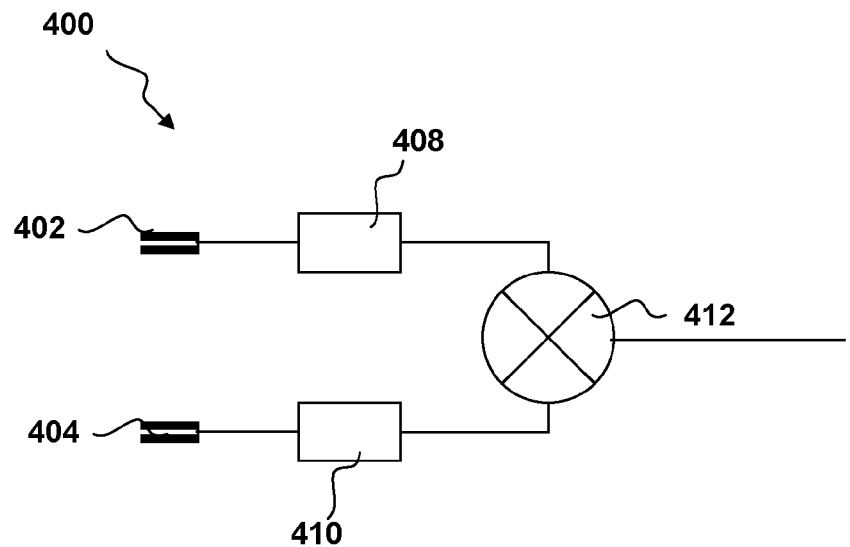
FIG. 11 is a schematic diagram showing an alternative sensor assembly comprising two quartz crystals.

A further variation is described with reference to FIG. 11. A sensor assembly 400 is shown in FIG. 11. The sensor assembly 400 comprises a first quartz crystal oscillator 402 and a second quartz crystal oscillator 404. The first quartz crystal oscillator 402 is driven by a drive circuit 408. The second quartz crystal oscillator 404 is driven by a drive circuit 410.

The first quartz crystal oscillator 402 and a second quartz crystal oscillator 404 differ in their sensitivity coefficients σ, where $$\sigma = \frac{\Delta f}{\rho} \quad \quad 9)$$

Where Δf is the change in frequency of the quartz crystal oscillator 402, 404 and ρ is the pressure of the gas being measured. The first quartz crystal oscillator 402 may have a large sensitivity coefficient $\sigma_1$, providing a large change in frequency with pressure. However, such a crystal may be unsuitable for high pressure operation, where excessive damping (ie. a loss of Q factor) reduces the performance of such a crystal. Therefore, the second quartz crystal oscillator 404 is provided which has a lower sensitivity coefficient $\sigma_2$ (where $\sigma_1 > \sigma_2$) enabling high pressures to be measured reliably.

Another situation in which it may be useful to have two crystals is in the case that there is a danger that one or both crystals become contaminated, either permanently or temporarily. Here the use of two identical crystals is indicated. The contamination will affect both crystals, but, owing to their different position in the gas path, this will almost always differ slightly.

In correct operation they will both give the same frequency. However, in the case of contamination, they will both indicate an incorrect frequency, but, because of their different levels of contamination, different incorrect frequencies: this discrepancy can be indicated to the user as a warning that the sensor assembly required cleaning or replacement in the case of permanent contamination and that the pressure indication may be inaccurate in any case.

An electronic switch 412 may be provided which enables one of the quartz crystal oscillators 452, 454 to be selected, depending upon whether a low or high pressure measurement is to be made. Such adaptability cannot be achieved with a conventional pressure gauge such as a Bourdon gauge, which must be replaced with a different gauge to measure different pressure ranges.

Additionally, the above embodiments have been described by measuring the absolute frequency of a quartz crystal oscillator. However, in self-contained electronics incorporated in a gas cylinder associated regulator, it may advantageous to measure the shift in frequency of the sensor by comparing that frequency with a reference crystal of identical type but enclosed in a vacuum or pressure package. The pressure package may contain gas at a selected density, gas under atmospheric conditions or may be open to the atmosphere external of the gas cylinder.

Figure 12:
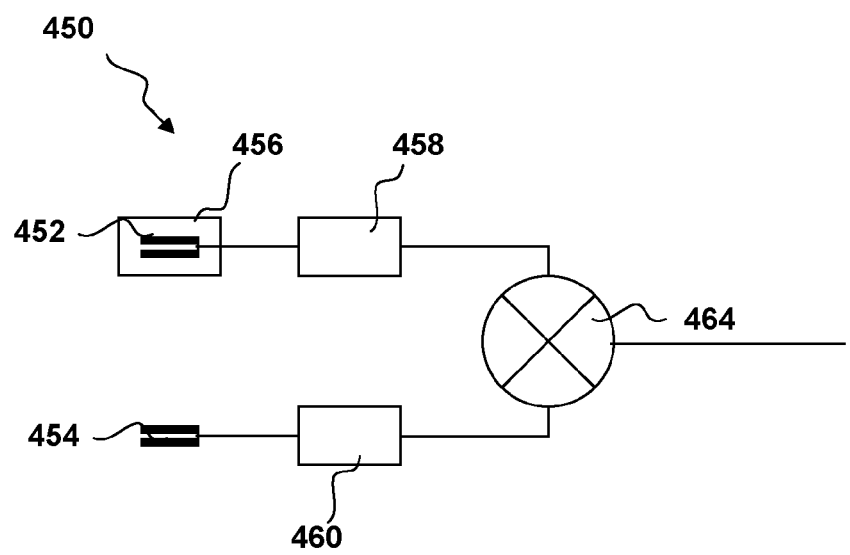
FIG. 12 is a schematic diagram showing a further alternative sensor assembly comprising two quartz crystals.

A suitable sensor assembly 450 is shown in FIG. 12. The sensor assembly 450 comprises a first quartz crystal oscillator 452 and a second quartz crystal oscillator 454. The first quartz crystal oscillator 452 is a reference crystal which is located within a sealed container 456 under vacuum. The first quartz crystal oscillator 452 is driven by a drive circuit 458.

The second quartz crystal oscillator 454 is a crystal similar to the crystal 210 described in the earlier embodiments. The second quartz crystal oscillator 454 is exposed to the gas environment within the housing 202. The second quartz crystal oscillator 454 is driven by a drive circuit 460.

This comparison may be performed using an electronic mixer circuit 464 which combines the two frequency signal and produces an output at a frequency equal to the difference between the two crystals. This arrangement enables small changes due to, for example, temperature to be negated.

Further, the circuitry used in the sensor assembly 204 can be simplified because only the difference frequency is required to be measured. Further, this approach is particularly suitable for use with a high frequency (MHz) crystal oscillator, where it may be difficult to measure the crystal frequency directly.

Additionally, all of the electronics required to measure and display the density, mass or mass flow need not be mounted on or in the housing 202. For example, electronic functions could be split between units mounted on the cylinder permanently and units mounted on either a customer's usage station or temporarily mounted on the outlet of the cylinder such as the position normally used for a conventional flow meter.

Figure 13:
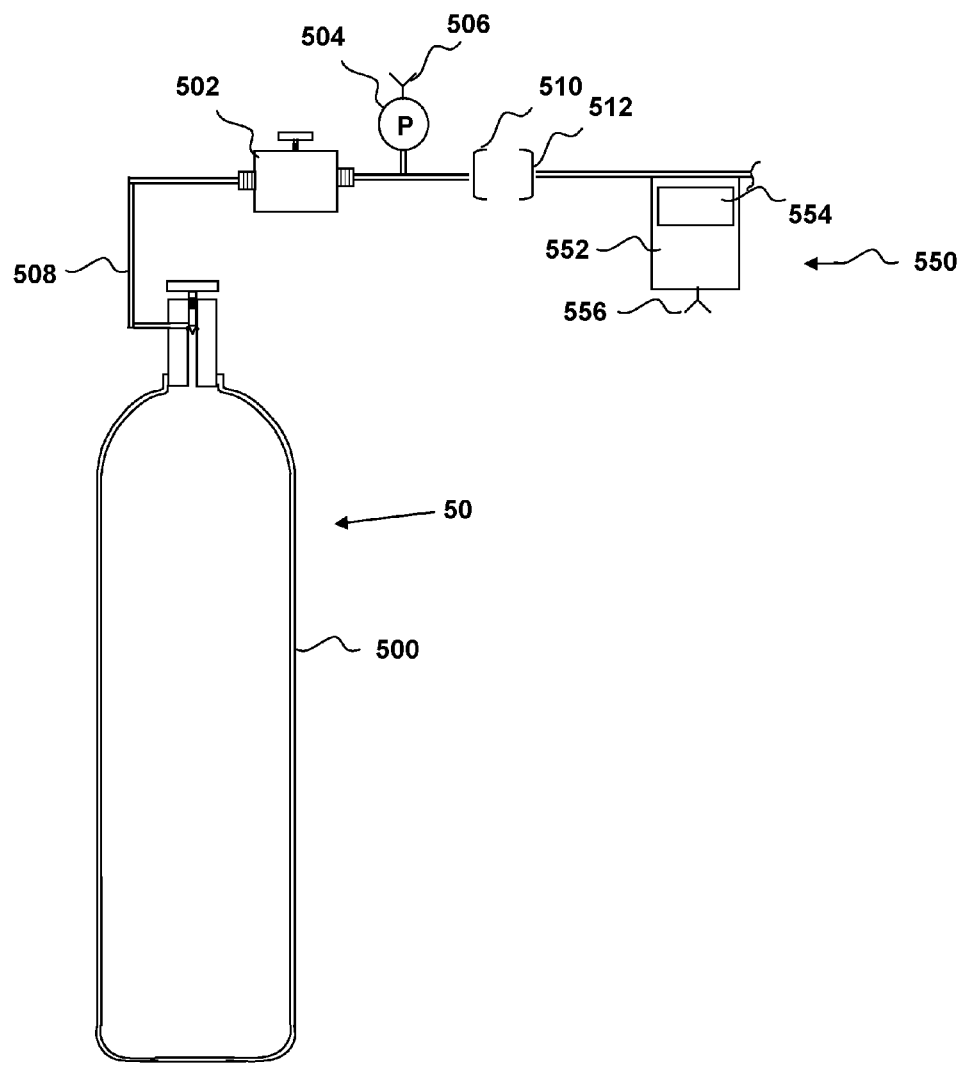
FIG. 13 shows an alternative arrangement using a remote electronic data unit.

An example of this arrangement is shown with reference to FIG. 13. The arrangement comprises a gas cylinder assembly 50 comprising a gas cylinder 500, a regulator 502 and a pressure gauge arrangement 504. The gas cylinder 500, regulator 502 and pressure gauge arrangement 504 are substantially similar to the gas cylinder 100, regulator 150 and pressure gauge arrangement 200 substantially as previously described with reference to previous embodiments.

In this embodiment, the pressure gauge arrangement 504 comprises a quartz crystal oscillator and drive circuit (not shown) similar to the quartz crystal oscillator 210 and drive circuit 212 of earlier embodiments. An antenna 506 is provided for communication via any suitable remote communication protocol; for example, Bluetooth, Infra-red (IR) or RFID. Alternatively, one-wire communication may be utilised.

As a further alternative, acoustic communication methods may be used. The advantage of such methods is that remote communication can be effected without the requirement for an external antenna 506.

A connection pipe 508 is connected to the outlet of the gas cylinder 500. The connection pipe is terminated by a quick connect connection 510. The quick connect connection 510 enables connecting pipe work or components to be connected and disconnected easily and quickly from the gas cylinder 500.

A quick connect unit 550 is provided for connection to the gas cylinder 500. A complementary quick connect connector 512 is provided for connection to the connector 510. Further, the quick connect unit 550 is provided with a data unit 552. The data unit 552 comprises a display 554 and an antenna 556 for communication with the antenna 506 of the pressure gauge arrangement 504. The display 554 may comprise, for example, an LCD, LED or daylight-readable display to minimise power consumption and maximise visibility of the display.

The data unit 552 may log various parameters as measured by the sensor assembly 502 of the gas cylinder assembly 50. For example, the data unit 552 could log pressure versus time. Such a log could be useful, for example, to welding contractors wishing to check that sufficient pressure was present during lengthy gas welding procedures on critical components, or to supply a company data on a particular customer's usage.

Alternatively, data from the data unit 550 can be output to a computer-enabled welding machine (for welding applications) or other gas-using equipment, to allow the calculation of derived parameters, along with warning messages.

Additionally, the data unit 550 may be arranged to provide the following functions: to contain and display data on pressure of gas, i.e. which types of welding, what types of metal welded, or give links so that mobile phones or computers can pick up detailed data; to provide multimode operation, e.g. a supplier/filler mode and a customer mode; to display different quantities to the customer from that which is displayed by the gas company which refills the cylinders; to allow input of data; to provide data such as a cylinder number, the type of gas, a certificate of analysis, a customer history (who had the cylinder over what dates), safety data and operational tips can be carried in summary form on the cylinder.

As an alternative, all of the above examples may, optionally, be processed, stored or obtained from a system located entirely on (or within) the gas cylinder 500 as discussed in terms of the pressure gauge arrangement 200, 502.

Whilst the above embodiments have been described with reference to the use of a quartz crystal oscillator, the skilled person would be readily aware of alternative piezoelectric materials which could also be used. For example, a non-exhaustive list may include crystal oscillators comprising: lithium tantalate, lithium niobate, lithium borate, berlinite, gallium arsenide, lithium tetraborate, aluminium phosphate, bismuth germanium oxide, polycrystalline zirconium titanate ceramics, high-alumina ceramics, silicon-zinc oxide composite, or dipotassium tartrate.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method of measuring the pressure of a gas, the method comprising:
    a) driving a piezoelectric oscillator in contact with the gas at a resonant oscillation frequency despite changes in the Q factor of the piezoelectric oscillator;
    b) measuring the resonant oscillation frequency of the piezoelectric oscillator; and
    c) determining the pressure of the gas from the measured resonant oscillation frequency of the piezoelectric oscillator, the known temperature of the gas and the known molecular weight of the gas.

2. A method according to claim 1, wherein step b) comprises:
    driving the piezoelectric oscillator by a drive circuit powered by a battery;
    cyclically alternating between switching the drive circuit on and off to conserve battery power; and
    measuring said resonant frequency over a pre-determined time period when the drive circuit is switched on to determine the pressure of gas.

3. A method according to claim 1, wherein the method further comprises: measuring the temperature of the gas using a temperature sensor.

4. A method according to claim 1, wherein two piezoelectric oscillators are provided, one of the piezoelectric oscillators having a sensitivity coefficient greater than that of the other of the piezoelectric oscillators and the method further comprising, prior to step b), selecting one of the piezoelectric oscillators.

5. A method according to claim 1, wherein said piezoelectric oscillator is provided downstream of a pressure reduction device.

6. A method according to claim 1, wherein the determining step takes into account the compressibility of the gas, in addition to the oscillation frequency of the piezoelectric oscillator, the known temperature of the gas, and the known molecular weight of the gas, to accurately measure gas pressures up to 900 bar.

7. A pressure gauge for measuring the pressure of a gas, the pressure gauge comprising:
    a housing connectable to a source of the gas and comprising an interior which is, in use, in communication with said gas;
    a sensor assembly located within the interior of said housing and including a piezoelectric oscillator which, in use, is in contact with the gas, a drive circuit arranged to drive the piezoelectric oscillator at a resonant oscillation frequency despite changes in the Q factor of the piezoelectric oscillator, and a processor, said sensor assembly being arranged to measure the resonant oscillation frequency of said piezoelectric oscillator in said gas and said processor being configured to determine, from the frequency measurement and the known temperature and known molecular weight of the gas, the pressure of the gas over a pressure range spanning two orders of magnitude.

8. A pressure gauge according to claim 7, wherein the sensor assembly further comprises a temperature sensor for measuring the temperature of the gas within the interior of said housing.

9. A pressure gauge according to claim 7, wherein the drive circuit is powered by a battery and wherein the sensor assembly is arranged to cyclically alternate between switching the drive circuit on and off to conserve battery power and to measure the oscillation frequency when the drive circuit is switched on.

10. A pressure gauge according to claim 7, wherein the drive circuit comprises a Darlington pair arranged in a feedback configuration from a common emitter amplifier.

11. A pressure gauge according to claim 7, wherein the piezoelectric oscillator comprises a quartz crystal oscillator.

12. A pressure reduction device comprising the pressure gauge of claim 7.

13. A pressure reduction device according to claim 12, in the form of a pressure regulator.

14. A pressure reduction device according to claim 13, wherein the pressure regulator is an electronic pressure regulator and the pressure gauge is operable to control the electronic pressure regulator.

15. A pressure reduction device according to claim 14, wherein the electronic pressure regulator comprises a solenoid valve, the sensor assembly being operable to control, in use, the solenoid valve.

16. A pressure gauge according to claim 7, wherein said sensor assembly is configured to accurately determine the pressure of the gas up to 900 bar from the frequency measurement, the known temperature and known molecular weight of the gas, and the compressibility of the gas.

17. A method of measuring the pressure of a gas, the method comprising:
    a) providing two piezoelectric oscillators, one of the piezoelectric oscillators having a sensitivity coefficient greater than that of the other of the piezoelectric oscillators;
    b) selecting one of the piezoelectric oscillators;
    c) measuring the oscillation frequency of the selected piezoelectric oscillator in contact with the gas; and
    d) determining the pressure of the gas from the oscillation frequency of the selected piezoelectric oscillator, the known temperature of the gas and the known molecular weight of the gas.

* * * * *